Patented Mar. 14, 1944

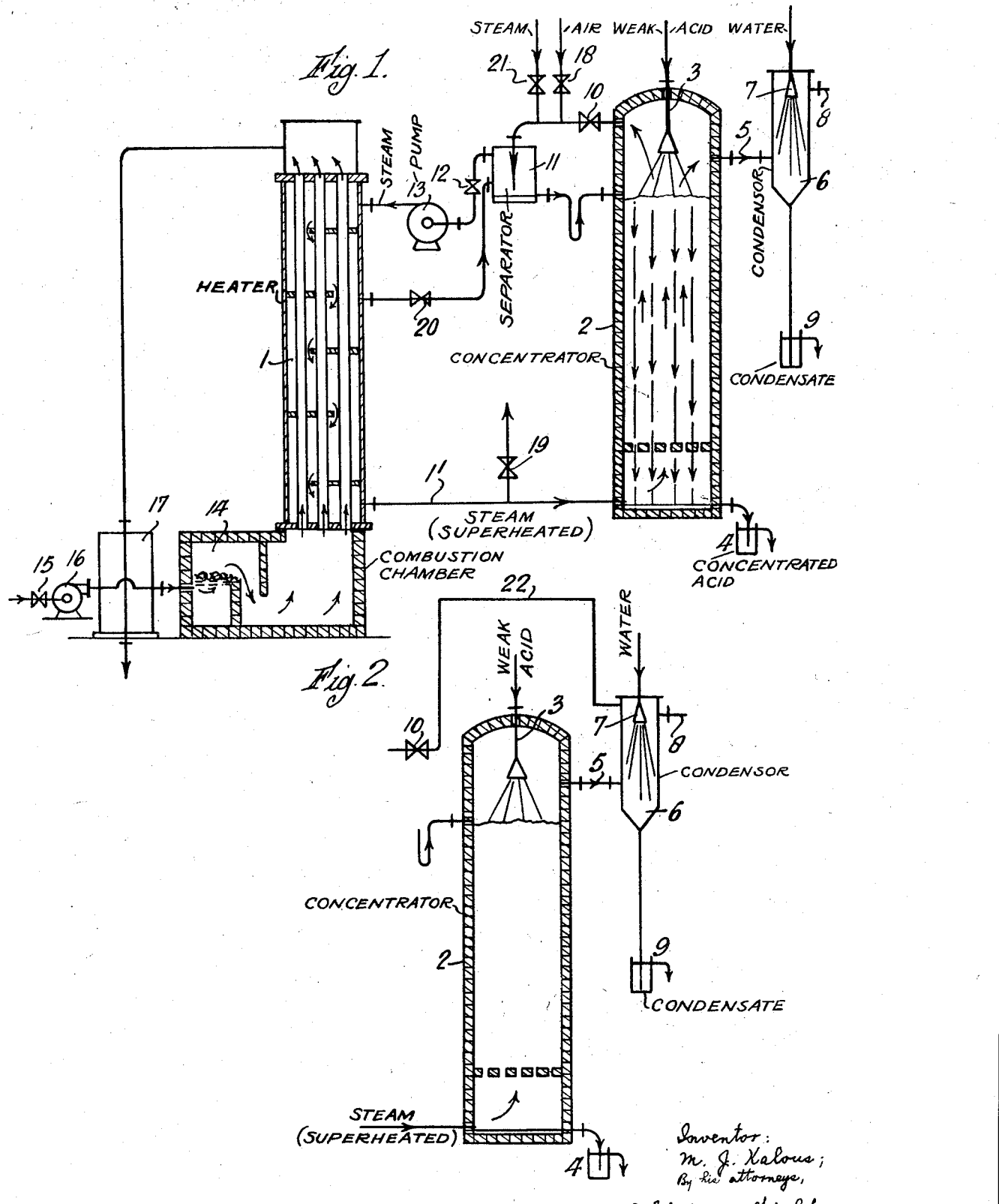

2,344,408

UNITED STATES PATENT OFFICE 2,344,408

CONCENTRATION OF SULPHURIC ACID

Mieczyslaw Joseph Kalous, Barn Croft, Shootersway, Berkhamstead, England

Application February 11, 1941, Serial No. 378,470
In Great Britain March 4, 1940

2 Claims. (Cl. 23—307)

This invention relates to an improved process for concentrating sulphuric acid.

The process of concentrating weak sulphuric acid by causing it to flow in direct contact with a stream of hot gases produced by combustion of combustible material or with a stream of such gases mixed with air is well known in the chemical industry.

Several concentrators for this process have been developed, such as the Kessler type, the Gaillard type and the "Chemico" drum type.

In all these processes the hot gases give up sensible heat to the acid thereby evaporating part of the diluent water, thus producing acid of a higher concentration.

It is evident that the gases being in direct contact with acid must be free from impurities, and it is in many cases necessary to use as fuel purified gas for the production of which expensive subsidiary plants are required.

When hot inert gases are brought into contact with boiling sulphuric acid they become charged with sulphuric acid vapours and although during the process they come into contact with weaker and cooler acid, whereby much of the sulphuric acid vapours condense and separate out of the gases, yet a part of the vapours remains suspended as droplets of minute size, termed sulphuric acid mist, which are extremely difficult to precipitate. The most successful installation used in current practice for the removal of sulphuric acid mist is an electrostatic precipitator through which the gases leaving the concentrator are passed before emission to the atmosphere. There again this auxiliary equipment and the electric control gear required are expensive items in the plant cost.

When inert gases are used as heating medium, they must leave the concentrator at a temperature above the dew point of the water vapour to be removed, thereby causing a heat loss, which together with the heat losses in the plants necessary to produce purified gas affects the heat economy of the system adversely.

This invention relates to an improved process in which the aforesaid disadvantages are overcome.

This is achieved by the use of superheated steam in direct contact with and flowing in countercurrent to the sulphuric acid to be concentrated, instead of gaseous products of combustion with or without admixture with air. The heat required for the concentration is thus supplied by the steam parting with superheat. After contact with the acid the steam remains superheated or has only undergone slight condensation.

A preferred system for carrying out this process is as follows:

Superheated steam is maintained in circulation between a heater and a concentrator, the heat required to concentrate sulphuric acid being supplied to the acid in the concentrator by this circulating superheated steam in direct contact with the acid in countercurrent to the acid, the heat removed from the circulating superheated steam being in turn supplied to this steam in the heater from an external heat source.

This invention may be carried into effect by employing, for example, apparatus as diagrammatically shown in the accompanying drawings of which Figure 1 illustrates the complete apparatus whilst Figure 2 illustrates a modification in the arrangement of the apparatus as regards the connection of the condenser.

Superheated steam leaves the heater 1, and, passing through the pipe 1', enters the concentrator 2, which may be of any design suitably arranged for the admission of superheated steam into direct contact with the acid to be concentrated, for example a tower filled with acid resisting material, as shown.

Weak acid is admitted to the upper part of the concentrator 2 through a distributor 3, and concentrated acid is extracted at the bottom by means of a siphon 4.

The superheated steam flowing up in countercurrent to the acid gives up heat to the latter, causing it to boil. The steam will accordingly entrain further steam generated by evaporation, as well as acid vapours. The acid vapours will quickly condense for the most part on encountering the weaker and cooler acid flowing down and practically all will have condensed out of the steam by the time the latter reaches the top part of the concentrator.

The additional steam corresponding to the amount of the steam thus generated by evaporation, is allowed to escape through vent 5 at the top of the concentrator 2, into condenser 6, whilst the major portion of the steam, still with some degree of superheat in it, which may be termed the circulating steam, leaves through valve 10.

The condenser 6 may be of any suitable type, but as an example it has been shown of the water sprayed type. Cooling water is admitted through distributor 7 in sufficient quantity to condense the steam entering through vent 5. Should this steam contain small amounts of sulphuric acid vapours, then these will also be condensed. Should it contain small amounts of sulphur dioxide, then these will be absorbed by the water so that no gas escapes to the atmosphere through vent 8, thereby eliminating any formation of acid mist. The vent 8 serves only to maintain about atmospheric pressure in the concentrator. The water and condensate leave through siphon 9.

The circulating steam, free of acid mist, leaving through valve 10 passes through separator 11, where any entrained droplets are separated out, and enters through regulating valve 12 into the pump 13 serving to maintain the circulation of the steam, and is delivered dry to the heater 1 in which heat is added to the steam before it again enters the concentrator 2. The heater 1 has for example been shown as a shell and tube exchanger in which heating gas coming from combustion chamber 14, passes through the tubes, whilst steam flows around the tubes countercurrent to the heating gas. The air required for the combustion enters through regulating valve 15 into the fan 16 which delivers it to the combustion chamber 14. To economise on fuel an airpreheater 17, heated by the stack gases from the heater 1, may be installed between the fan 16 and the combustion chamber 14. The fuel burned in the combustion chamber 14 may be supplied to the grate by a mechanical feeder. This arrangement for superheating the steam may of course be replaced by any other suitable installation.

To put the system into operation the procedure may be as follows:

The pump 13 is started and air entering through valve 18 is passed through the heater 1 and discharged through purge valve 19. A slow combustion in combustion chamber 14 is started whereby the heater 1 is warmed up. The by-pass valve 20 is opened so that the separator 11 and pump 13 are also warmed up. When this equipment has reached a temperature above 100° C. steam is gradually admitted through valve 21 to replace the air current and valve 18 is shut. Valve 20 is regulated to keep the temperature at the inlet to pump 13 above dew point. Acid and water are now admitted to the concentrator 2 and condenser 6 respectively and the purge valve 19 is gradually closed thus forcing the steam through the acid. When the air has been driven out of the system and the proper temperature is reached in the top of the concentrator 2, valve 10 is gradually opened and valve 21 gradually closed, after which the system is in operation.

To stop the system, the procedure may be as follows:

After slowing down to reduced capacity valve 10 is gradually closed and valve 21 gradually opened, purge valve 19 is gradually opened and the acid supply stopped. After thus purging, steam is replaced by air entering through valve 18 and the separator 11, pump 13 and heater 1 are dried out so that no condensation is possible when the fire is extinguished.

It will be understood that the process may be operated not only at or about atmospheric pressure but also at pressures substantially above or below atmospheric pressure.

With reference to the modification of the apparatus illustrated in Figure 2, it will be seen that this consists in placing the condenser 6 in the steam cycle, i. e. between the concentrator 2 and the valve 10 with the aid of the connecting pipe 22. By this modification all of the circulating steam must pass through the condenser 6, and by regulating the water spray at 7 the steam may be cooled down to 100° C. and that part of the steam which corresponds to water evaporated from acid may be condensed. By this means traces of entrained acid would be washed down by condensing steam. The regulation is rendered easy by observation of the vent 8, through which a very small amount of steam should always escape, thus preventing air being sucked in by the blower.

This invention makes it possible to obtain the following advantages as compared with the established methods using gaseous products of combustion, with or without admixture with air, in direct contact with acid. Firstly, as described above, as no inert gases leave the concentrator proper a simple condenser replaces the elaborate and expensive equipment required for precipitation of sulphuric acid mist, which is contained in inert gases leaving a concentrator.

Secondly, as also described above, the acid is heated directly by steam which is itself heated indirectly by combustion gases and therefore the combustion gases need not be specially cleaned and any fuel in common use may be employed as heating material. It is therefore unnecessary to install a gas plant and special gas cleaning equipment, and the replacements of these rather expensive items by a simple coal fired steam superheater results in a considerable economy in the capital cost of the concentration plant.

It will be understood that there may be two or more concentration units, each comprising substantially a heater and a concentrator, and connected in series in such a way that superheated steam passes through heater No. 1 to concentrator No. 1, from concentrator No. 1 to heater No. 2, from heater No. 2 to concentrator No. 2, and so forth, with the steam leaving the last concentrator returned to heater No. 1.

Alternatively, there may be two or more concentration units, each comprising substantially a heater and a concentrator and connected in series in such a way that steam from a convenient source of supply passes through heater No. 1, and thence superheated to concentrator No. 1, from concentrator No. 1 to heater No. 2, from heater No. 2 to concentrator No. 2, and so forth, with the steam leaving the last concentrator being condensed or released to the atmosphere.

What I claim is:

1. The process for concentration of sulphuric acid which comprises passing weak acid and superheated steam in counter-current flow and in direct contact through a concentrating tower where the steam gives up heat to the acid, passing the steam from the tower after such counter-current flow to a heating zone where heat on the order of that given up in the tower is added to the steam, passing the superheated steam from the heating zone back to the tower for recontact with weak acid, the flow of steam from the tower through the heating zone and tower being maintained as a closed circulating system, removing from the circulating steam an amount of steam corresponding with that generated in the tower by passage of the steam therethrough, and removing concentrated acid from the bottom of the tower.

2. The process for concentration of sulphuric acid which comprises passing weak acid and superheated steam in counter-current flow and in direct contact through a packed concentrating tower where the steam gives up heat to the acid, passing the steam from the tower after such counter-current flow to a liquid separating zone to remove any entrained moisture and thence through a heating zone where heat on the order of that given up in the tower is added to the steam, passing the superheated steam from the heating zone back to the tower for recontact with weak acid, the flow of steam from the tower through the separating zone, heating zone and tower being maintained as a closed circulating system, removing from the circulating steam an amount of steam corresponding to that generated in the tower by passage of the steam therethrough, and removing concentrated acid from the bottom of the tower.

MIECZYSLAW JOSEPH KALOUS.